United States Patent [19]

Perkins et al.

[11] 3,905,949

[45] Sept. 16, 1975

[54] STILBENE AZO LITHIUM SALT DYES

[75] Inventors: Melvin A. Perkins, Wilmington, Del.; Howard K. Urion, Woodstown, N.J.

[73] Assignee: E. I. Du Pont de Nemours and Company, Wilmington, Del.

[22] Filed: Aug. 1, 1969

[21] Appl. No.: 846,981

Related U.S. Application Data

[63] Continuation-in-part of Ser. No. 451,979, April 29, 1965, abandoned.

[52] U.S. Cl. .............. 260/143; 162/162; 260/169; 260/205; 260/505 C; 260/505 N
[51] Int. Cl.² .............. C07C 105/00; C09D 27/02; D21H 3/80
[58] Field of Search .......... 260/143, 169, 205; 8/41; 162/162

[56] References Cited
UNITED STATES PATENTS

| | | | |
|---|---|---|---|
| 1,531,098 | 3/1925 | Holzach | 260/143 |
| 1,708,897 | 4/1929 | Rheiner | 260/143 |
| 1,861,323 | 5/1932 | Schmid | 260/143 |
| 1,982,159 | 11/1934 | Gressly | 260/143 |
| 2,004,250 | 6/1935 | Schindhelm et al. | 260/169 X |
| 2,044,891 | 6/1936 | Schindhelm | 260/143 |
| 2,056,539 | 10/1936 | Schindhelm et al. | 260/169 X |
| 2,314,023 | 3/1943 | Straub et al. | 260/143 |
| 2,865,908 | 12/1958 | DeHoff | 260/143 |
| 2,875,211 | 2/1959 | Seibert et al. | 260/169 X |
| 3,122,529 | 2/1964 | Huey et al. | 260/143 |
| 3,547,774 | 12/1970 | Rebhahn et al. | 260/143 X |
| 3,557,079 | 1/1971 | Doody | 260/143 |

FOREIGN PATENTS OR APPLICATIONS

| 228,828 | 1/1944 | Switzerland | 260/205 |
|---|---|---|---|

*Primary Examiner*—Floyd D. Higel

[57] ABSTRACT

Stilbene azo dyes, as lithium salts or mixed lithium and sodium salts wherein the ratio of lithium to sodium is at least 1:2, especially useful for dyeing paper or paper pulp, prepared by condensing a member of the group consisting of the lithium salt of 5-nitro-o-toluenesulfonic acid and the dilithium, monolithium monosodium, and disodium salts of 4,4'-dinitro-2,2'-stilbenedisulfonic acid, in an aqueous alkaline medium, at a temperature of from about 20°C. to the boiling temperature of the reaction medium, in the presence of sufficient ionic lithium to provide a ratio of lithium to sodium in the dye of at least 1:2 until formation of said stilbene azo dye is substantially complete, the condensation reaction product optionally being reacted with a reducing agent selected from the group consisting of aliphatic aldehydes, hydroxyaliphatic aldehydes, glycerol, alkanolamines, alkali metal sulfites and alkali metal sulfides to achieve shade variation.

12 Claims, No Drawings

STILBENE AZO LITHIUM SALT DYES

CROSS-REFERENCE TO RELATED APPLICATION

This is a continuation-in-part of copending application and Ser. No. 451,979 filed Apr. 29, 1965 and abandoned Aug. 21, 1969.

DESCRIPTION OF THE INVENTION

This invention is directed to lithium salts of 5-nitro-o-toluenesulfonic acid [$SO_3H = 1$], known as Para acid, of 4,4'-dinitro-2,2'-stilbenedisulfonic acid, and of yellow or orange direct dyes prepared by alkaline condensation of these dye intermediates. The present invention also relates to direct stilbene azo dyes in liquid form which comprise the stable, concentrated aqueous solutions and liquid forms of the lithium salts of said dyes.

The stilbene dyes are widely used in the dyeing of paper or paper pulp and are generally sold in the form of powders. These dye powders are troublesome to manufacture and use in the mills for dyeing paper. In manufacture of the dye powders, drying, grinding, dust-treatment, and standardization operations are required. In addition to dusting problems, it has been found in mill experience that the cold water beater dyeing strength of the dye powders on paper prepared from the dyed pulp is generally too low. Also the slow rate at which dye powders dissolve in cold water is a particular disadvantage. During winter months, the temperature of water used in paper beater dyeing operations sometimes approaches the freezing point.

It is an object of the present invention to provide a novel group of stilbene lithium sulfonate dyes and a novel class of lithium salts utilized as dye intermediates. It is a further object of this invention to provide direct stilbene azo dyes in liquid form as herein described and claimed.

These and other objects of the invention will be apparent from the following description and claims.

According to the present invention, the above disadvantages are significantly and unexpectedly overcome by employing concentrated stilbene azo dye preparations in liquid form prepared as described below. Such preparations require less time and are more convenient to use in the mills, and their dye strength development is effected more efficiently in cold water beater applications. It has been discovered that these advantages are significant when at least one of the sulfo groups in the stilbenedisulfonic unit of the dye is a lithium sulfonate.

An additional advantage of the present invention is illustrated by Example 6 wherein it is demonstrated that the desirable green shades of yellow can be obtained without resorting to the special combinations of salts and reducing agents required in the dye preparations according to U.S. Pats. Nos. 2,865,908 and 3,122,529. In addition to the green-shade yellows, the present invention provides for the manufacture of red-shade yellow and orange stilbene azo dyes in concentrated liquid paste form having significant advantages in application properties.

The present invention involves the process of converting 5-nitro-o-toluenesulfonic acid [$SO_3H = 1$], 4,4'-dinitro-2,2'-stilbenedisulfonic acid, or their sodium salts, into their lithium salts by reacting the former or their ion-exchange complexes with a lithium base in aqueous medium, followed by aqueous alkaline condensation of one or a mixture of said lithium salts; and wherein said alkaline condensation is optionally performed simultaneously with or prior to treatment with one or more reducing agents selected from the group consisting of aliphatic aldehydes, hydroxy-aliphatic aldehydes, glycerol, alkanolamines, alkali metal sulfites or alkali metal sulfides.

Although structures for some of the products of the condensation reactions described herein are depicted in the following examples, the dyes have not been definitely characterized and it is generally accepted in the literature that assignment of structures to dyes prepared by such alkaline condensation reactions is tentative and indefinite. Moreover, as the term is used herein "stilbene azo dyes" includes any alkaline condensation reaction product which contains the -N=N- group. Thus, the term includes azoxy derivatives.

The present invention includes:

A. the process of heating an aqueous solution of one mole of the lithium salt of Example 1 in the presence of at least 0.07 mole of lithium hydroxide at about 20°C. to the boiling temperature until formation of product consisting mainly of the dye having the probable structure shown in Example 4 is complete;

B. process as in (A) starting with mixtures of the lithium salt of Example 1 and either one of Examples 2 and 3 which vary in parts by weight between 70:30 and 90:10, respectively;

C. the process of heating one mole of an aqueous solution of 4,4'-dinitro-2,2'-stilbenedisulfonic acid, disodium salt, and at least 4 moles of 5-nitro-o-toluenesulfonic acid [$SO_3H = 1$], lithium salt, in the presence of at least 0.3 mole of lithium hydroxide at about 40° to 65°C. until formation of product consisting mainly of the dye having the probable structure shown in Example 7 is complete;

D. the process of (A) followed by an alkaline reduction step in which the dye is heated in the presence of at least 0.2 mole of lithium or sodium hydroxide at about 50° to 85°C. with a reducing agent until formation of product consisting mainly of the dye having the probable structure shown in Example 8 is complete;

E. dye liquid compositions comprising about 10 to 50 parts of a dye or dyes defined in (A), (C) and (D) and 90 to 50 parts of water, containing less than about 2% by weight of alkali metal hydroxide and less than about 1% by weight of alkali metal sulfate;

F. in a process of dyeing paper pulp by the beater dyeing method, the improvement which consists in using as a colorant a dye composition defined in (A), (B), (C) and (D).

Representative examples further illustrating the present invention follow.

EXAMPLE 1

13.3 Parts of an aqueous filter cake which contains ten parts of 5-nitro-o-toluenesulfonic acid [$SO_3H = 1$] (Para acid) and a small amount of sulfuric acid are neutralized to pH $7.0 \pm 0.2$ by stirring into a solution of 2.4 parts of lithium hydroxide monohydrate in ten parts of water. A solution of the novel lithium salt of 5-nitro-o-toluenesulfonic acid is obtained which contains about 39% by weight of said acid calculated as the free sulfonic acid (or 40% calculated as the lithium salt)

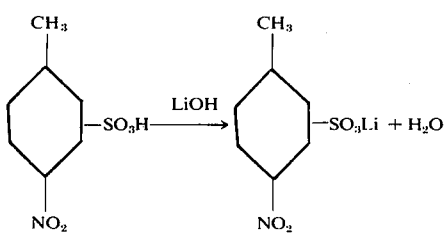

The solution is very fluid and remains clear of crystals or other sediment even after standing for weeks. The pH is regulated at 7.0 ± 0.2 to avoid formation of yellow dye which might occur upon long standing at higher pH values.

The 40% stock solution thus prepared is three to four times as concentrated as can be obtained from the corresponding sodium salt which has been used in the past for manufacture of so-called "Stilbene Yellows."

If desired, the novel lithium salt may be obtained in dry form by evaporating the concentrated stock solution to dryness. Likewise, by starting with pure Para acid in water and neutralizing with lithium hydroxide, a pure form of the lithium salt of Para acid is obtained on drying. In an alternate process, the lithium salt of Para acid is obtained free of inorganic salts by using either Para acid or its sodium salt in the ion exchange process of Example 3.

EXAMPLE 2

600 Parts of aqueous filter cake containing 466 parts of 4,4'-dinitro-2,2'-stilbenedisulfonic acid, disodium salt, are stirred in a sufficient quantity, about 1000 parts, of 10% sulfuric acid to maintain a stirrable mixture at 55°C. The temperature is raised to 90°± 10°C. where it is maintained while continuing the stirring until solution occurs, about 1 hour. After cooling to 30°C., the strongly acidic mass is filtered. The firmly pressed filter cake is washed with small portions of iced water to remove most of the sulfuric acid. The filter cake, which consists mostly of the 4,4'-dinitro-2,2'-stilbenedisulfonic acid, monosodium salt, is slurried in 600 parts of water, and is neutralized to pH 6.5–7.0 by addition of lithium hydroxide monohydrate. About one mole proportion of the base is required, or 41.2 parts. The novel monolithium-monosodium salt is obtained,

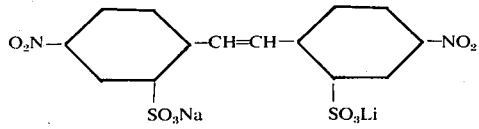

This novel salt is obtained in dry form upon evaporating the neutralized preparation to dryness.

The novel monolithium-monosodium salt can be used for preparation of more fluid liquid dye aqueous concentrates than are obtainable from the corresponding disodium salt such as that used as starting material in this example.

EXAMPLE 3

Preparation of lithium salt by ion exchange:

A concentrated aqueous paste containing 94.9 parts (0.2 mole) of 4,4'-dinitro-2,2'-stilbenedisulfonic acid, disodium salt, is slurried into a solution consisting of 1560 parts of trichlorobenzene and 182 parts of "Amberlite LA-1" (High molecular weight, oil soluble, water insoluble, liquid secondary amines, possessing ion-exchange properties, C and EN, pp. 60-61, Nov. 30, 1959, Rohm and Haas Company, Washington Square, Philadelphia 5, Pa.).

21 Parts of 95% sulfuric acid are slowly added to the slurry to adjust the pH at 4.0–4.5. The reaction mass is allowed to settle, and the bottom (solvent) layer is drawn off. The aqueous layer, containing sodium sulfate is discarded. The solvent layer contains the "Amberlite LA-1" salt of 4,4'-dinitro-2,2'-stilbenedisulfonic acid in solution. This solution is extracted by treatment with a 5% aqueous solution of lithium hydroxide (about 200 parts) until the water layer, obtained upon settling the extraction mass, shows a pH of 10.5–11.0. This water layer, which contains the dilithium salt of 4,4'-dinitro-2,2'-stilbenedisulfonic acid partly in solution and partly as crystals, is drawn off. The product is purified by heating the water layer until all the solid dissolves at 80°–85°C. Residual solvent that had been entrapped is now settled out and carefully withdrawn from the hot solution. The hot aqueous solution analyzes 30–32% 4,4'-dinitro-2,2'-stilbenedisulfonic acid, dilithium salt,

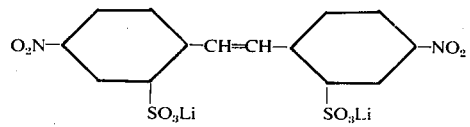

This novel salt is obtained in dry form upon evaporating the solution to dryness.

Lithium carbonate may be used in place of lithium hydroxide in the present example.

EXAMPLE 4

Direct dye from Para acid, lithium salt, and lithium hydroxide:

a. 150 Parts of the 40% stock solution of 5-nitro-o-toluene-sulfonic acid, lithium salt, as prepared in Example 1, are stirred and heated to 75°C. followed by addition of 5.5 parts of lithium hydroxide monohydrate. The temperature of the strongly alkaline reaction mass is maintained at 75° ± 3°C. for 3 hours. At this time a spot test on paper no longer shows a bleed through the paper. The mass is then cooled to 40°C. and 85% phosphoric acid is added until the pH is reduced from above 11 to 5–7. The resulting concentrated liquid dye paste contains as a major component the lithium salt of the red-yellow dye of probable structure

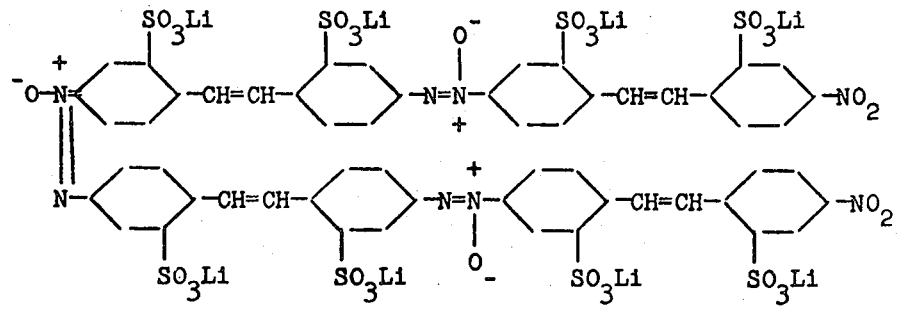

which is useful as a dye for paper and leather and also in the preparation of lakes. Evaporation of water from this dye paste gives the dye in dry form.

The exact shade of the yellow dye of this example may be varied, depending on the concentration of alkali, the temperature, and time of reaction.

The amount of lithium hydroxide used in the present example is about 0.5 mole per mole of Para acid, lithium salt. Dye can be obtained by using as little as about 0.07 mole of lithium hydroxide per mole of Para acid. More than 0.5 mole of lithium hydroxide may be used but is not required. The temperature of this reaction may be varied from about room temperature (20°C.) to the boiling temperature, and the reaction is continued until dye formation is complete as indicated by spot test on paper, at which time the spot no longer shows a bleed through the paper. When heating is continued beyond the time of complete reaction as indicated by the spot test, the redness of the yellow shade is increased.

The amount of water used in the process of this example may be varied so that the concentration of dye in the final paste is between about 10 to 50% by weight.

If desired, the cooled reaction mass in the present example may be partially neutralized, using less acid, so as to reduce the pH to about 9. Such a dye paste is entirely satisfactory for some coloration processes, however the paper mills prefer to use pastes which are in the range of about pH 5–7. In general, it is preferred to offer to the trade the novel dye pastes of this invention which contain less than about 2% by weight of alkali metal hydroxide and less than about 1% by weight of alkali metal sulfate. The amount of sulfate salt depends on the acidity [$H_2SO_4$] of the Para acid filter cake used as starting material as indicated in Example 1.

b. 150 Parts of the 40% stock solution of 5-nitro-o-toluenesulfonic acid, lithium salt, as prepared in Example 1, and two parts of lithium hydroxide monohydrate are agitated and heated at refluxing temperature (about 102°C.) for 0.5 hour. The reaction is complete as indicated by the spot test described in part (a) of the present example. The reaction mass is cooled and acidified as described in part (a). The resulting concentrated liquid dye past contains mainly the lithium salt of the redyellow dye disclosed in part (a).

If desired to obtain a redder shade yellow dye, a reducing agent (e.g. about 2 parts of dextrose) may be added to the reaction masses of the present example, either during or at the end of the heating period.

EXAMPLE 5

Direct dye from Para acid, lithium salt, in presence of sodium hydroxide:

150 Parts of the 40% stock solution of 5-nitro-o-toluenesulfonic acid, lithium salt, as prepared in Example 1, are stirred and heated at 70°C. followed by addition of four parts of lithium hydroxide monohydrate and then by four parts of sodium hydroxide previously dissolved in six parts of water. The temperature of the reaction mass is maintained at 70° to 75°C. for four hours, after which 50 parts of cold water are added. The resulting concentrated liquid dye paste contains as a major component the mixed Na-Li salt of a red-yellow dye which, in the form of its free acid, is believed to have the structure

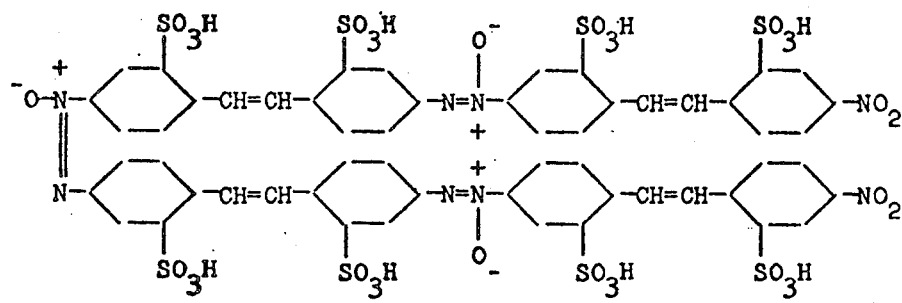

and is similar in properties to the dye of Example 4.

EXAMPLE 6

Direct dye from a mixture of Para acid, lithium salt, and 4,4'-dinitro-2,2'-stilbenedisulfonic acid, monolithium monosodium or dilithium salt:

A mixture consisting of 630 parts of the 40% stock solution of 5-nitro-o-toluenesulfonic acid, lithium salt (1.13 mole) as prepared in Example 1, and 109 parts of 4,4'-dinitro-2,2'-stilbenedisulfonic acid, monolithium monosodium salt (0.24 mole) as prepared in Example 2 is agitated and heated to 60°–65°C., and 21 parts of lithium hydroxide monohydrate are added. Dye formation starts almost immediately and is allowed to continue 1.5 hours at which time reaction is complete as shown by visible spectro analysis and dyetest on paper against a known standard. Then the reaction is interrupted by cooling and neutralization with 85% phosphoric acid. The resulting concentrated liquid dye paste contains as a major component the green-yellow dye of the probable structure:

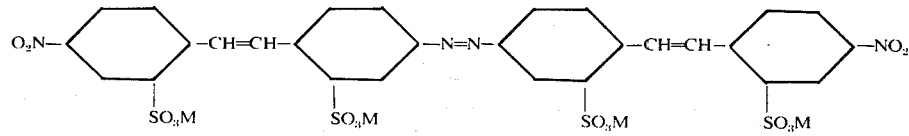

in which M represents Li and Na in the average ratio of about 6 to 1, respectively. This dye is useful in the dyeing of paper pulp. Most of the sulfo groups in the novel dye are in the form of lithium sulfonate and the dye is more completely dissolved as compared with the similar dye made by using the sodium salts of the dye intermediates and sodium hydroxide as the alkali.

Likewise, a similar highly concentrated liquid dye paste is obtained when the 4,4'-dinitro-2,2'-stilbenedisulfonic acid, monolithium monosodium salt, used in the present example is replaced by a molar equivalent of the dilithium salt of this intermediate. In this instance all of the sulfo groups are present as lithium sulfonate. If desired, ten parts each of lithium hydroxide monohydrate and sodium hydroxide may be used in this modification of the example in lieu of 21 parts of lithium hydroxide monohydrate.

The shade of the dye obtained in the present example can be varied somewhat depending upon not only the alkali concentration, temperature, and time of the reaction as described in Example 4, but also the ratio of the two dye intermediates employed. This ratio of nitrotoluenesulfonate to dinitrostilbenedisulfonate can be varied in parts by weight, respectively, from 30:70 to 90:10 and still give liquid dyes of high concentration. Use of more than about 50% by weight of dye intermediate of the dinitrostilbenedisulfonate type gives products which are too viscous for use as liquid dyes except in more dilute solutions.

The amount of water used in the process of this example may be varied so that the concentration of dye in the final paste is between about 10 and 50% by weight. Obviously, lower concentrations of liquid dyes can be obtained by diluting these concentrates with water.

When a redder yellow is desired, the temperature or time of heating is extended. The dye obtained in this instance contains some of the higher molecular weight condensation product shown in Example 4.

EXAMPLE 7

Direct dye from a mixture of Para acid, lithium salt, and 4,4'-dinitro-2,2'-stilbenedisulfonic acid, disodium salt:

A mixture consisting of 630 parts of the 40% stock solution of 5-nitro-o-toluenesulfonic acid, lithium salt (1.13 mole) as prepared in Example 1, and 109 parts of 4,4'-dinitro-2,2'-stilbenedisulfonic acid, disodium salt (0.23 mole) in an aqueous filter cake containing 40 parts of water, is agitated and heated to 60°C. Then 21 parts of lithium hydroxide monohydrate are added. Agitation is continued as the temperature automatically rises to about 65°C. and then falls back to about 55°C. (2 hours). The reaction is complete as shown by visible spectro analysis and dyetest on paper against a known standard. 100 Parts of cold water are added, followed by 15 parts of 85% phosphoric acid. The resulting concentrated liquid dye paste contains as a major component the green-yellow dye of the probable structure:

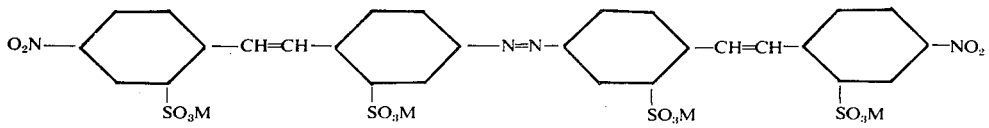

in which M represents Li and Na in the average ratio of about 2.4 to 1, respectively.

The amount of water used in the process of this example may be varied so that the concentration of dye in the final paste is between about 10 and 50% by weight. At the lower end of this concentration range, one may use a larger proportion of the dinitrostilbenedisulfonic acid, disodium salt, so that the Li and Na average ratio is about 1 to 2, respectively (1 mole Para acid, Li salt:1 mole dinitrostilbenedisulfonic acid, disodium salt).

The same green-yellow dye is obtained when less lithium hydroxide is used in this example, say five parts, but in this case the time of reaction is much extended.

EXAMPLE 8

Direct dye from Para acid, lithium salt, and reducing agent:

a. 480 Parts of 38.5% stock solution of 5-nitroo-toluenesulfonic acid, lithium salt are stirred and heated to 75°C. followed by addition of 17.2 parts of lithium hydroxide monohydrate. The temperature of the reaction mass is maintained at 75°C. for 2.5 hours.

Reduction Step: Then 165 parts of 10.4% (by weight) lithium hydroxide solution are added and the temperature is maintained at 70° to 75°C. Solid dextrose hydrate ("Cerelose") is added in portions (total, about 63 parts) such that the temperature is maintained at 75°-80°C. and a sample of the reaction mass used in a test dyeing on paper gives an orange shade with little or no yellow remaining. Then agitation is continued at 75°C. until there is no increase in the redness of shade of a test dyeing on paper, which is the case after about two hours. The reaction mass is allowed to cool to ambient temperature. 85% Phosphoric acid is added to adjust the pH to 6.5. The paste thus obtained is a very thin dye preparation in liquid form having an intense dark color, and is used directly in commercial applications. It contains as a major component the orange dye of the probable structure:

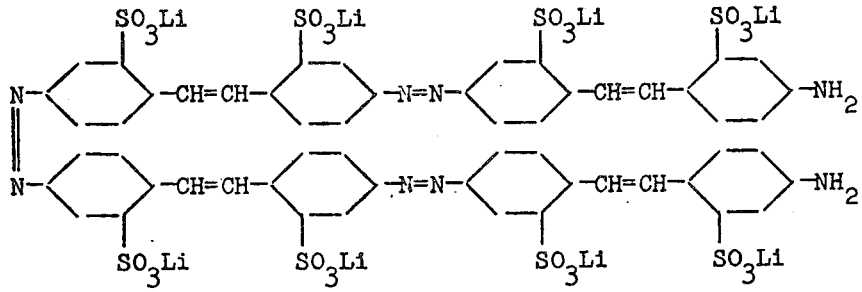

It gives dyeings on sized paper approximating the shade of C.I. Direct Orange 15 (C.I. 40002).

If desired other reducing agents or mixtures of reducing agents may be used instead of dextrose in the above process. These are known in this connection and include such agents as the alkali metal sulfites or sulfides, hydroxy aliphatic aldehydes other than dextrose, glycerol, alkanolamines such as diethanolamine, and the like.

The temperature employed in the present example may be varied from about 60° to 100°C. but the preferred range is 65° to 85°C.

b. The process of part (a) of this example may be modified in order to obtain a mixed Li-Na salt of the dye. For instance, the 17.2 parts of lithium hydroxide monohydrate used in the condensation step is replaced by 64 parts of 30% sodium hydroxide solution. This gives a concentrated liquid dye paste which solidifies upon standing. However, the fresh liquid paste may be used in the reduction step of part (a) to yield a mixed Li-Na salt of the orange dye which is stable in concentrated liquid form. Instead of sodium hydroxide alone, a mixture of the two caustic alkalies may be used in the condensation step.

c. In another modification of part (a) of this example, the 165 parts of 10.4% lithium hydroxide solution used in the reduction step are replaced by 165 parts of 17% sodium hydroxide solution. A stable, concentrated liquid orange dye paste is obtained.

The alkaline condensations disclosed in the above examples are interrupted by additions of 85% phosphoric acid. Other acids may be employed for this purpose such as: sulfuric, hydrochloric or acetic acid.

EXAMPLE 9

Direct dye from lithium salts of 4,4'-dinitro-2,2'-stilbenedisulfonic acid:

a-1. 240 Parts of the solution of 4,4'-dinitro-2,2'-stilbenedisulfonic acid, dilithium salt, as prepared in Example 3, and 27.5 parts of diethanolamine are heated at 92°C. for 24 hours. A concentrated solution consisting mainly of the green-yellow dye of Example 6 is obtained in which M is lithium.

a-2. 76 Parts of the dry monolithium monosodium salt of 4,4'-dinitro-2,2'-stilbenedisulfonic acid, as prepared in Example 2 are heated in 164 parts of water and 27.5 parts of diethanolamine at 92°C. for 24 hours. A solution of the green-yellow dye of Example 6 is obtained, the dye being in the form of the dilithium disodium salt.

b. When the procedure of part a-2 of this example is repeated except that two parts of lithium hydroxide monohydrate are added to the condensation mass, a redder yellow dye is obtained which is mainly a mixture of the dyes of Examples 5 and 6 in which the dye salt contains lithium and sodium in approximately equal amounts.

c. 280 Parts of the solution of 4,4'-dinitro-2,2'-stilbenedisulfonic acid, dilithium salt, as prepared in Example 3, 9.6 parts of lithium hydroxide monohydrate, 21 parts water, 7 parts of 37% formaldehyde solution, and 2.6 parts of dextrose hydrate ("Cerelose") are mixed and heated at 60°C. for 4.5 hours. A solution of the green-yellow dye of Example 6 is obtained, the dye being in the form of its tetralithium salt.

When 14 parts of 37% formaldehyde solution are used in part (c) of this example instead of the 7 parts of 37% formaldehyde and 2.6 parts of "Cerelose," similar results are obtained.

EXAMPLE 10

Dyeing Procedure:

One part of the concentrated liquid form of the dye prepared in Example 4(a) is added to an aqueous slurry of 100 parts (dry basis) of bleached sulfite pulp in 5000 parts of water at room temperature (the water temperature may vary in normal mill practices from 2°C. in the winter in northern localities to 38°C. in the summer in warmer climates). Two parts each of rosin size and aluminum sulfate octadecahydrate $[Al_2(SO_4)_3 \cdot 18\ H_2O]$ are then added, the mixture is thoroughly agitated for 10 to 20 minutes and water is added to give a total of 20,000 parts. Paper sheet is then made up in the usual manner to provide yellow colored paper.

The amount of dye employed in this procedure may be varied from 0.1 to 3.0 parts to give lightly tinted to deeply colored dyeings. The percent by weight of air dried paper pulp in the initial slurry may vary from 0.4 to 3. Likewise, the amount of rosin size and aluminum sulfate used may vary from about 0.5 to 3 parts and from 1 to 4 parts, respectively, or these additives may be omitted.

Similarly, any of the dyes disclosed in the above dye examples, or mixtures of these, may be used in the dyeing process of Example 10 to give strong, even dyeings on paper.

The preceding representative examples may be varied within the scope of the present total specification disclosure, as understood and practiced by one skilled in the art, to achieve essentially the same results.

The embodiments of the invention in which an exclusive property or privilege is claimed are defined as follows.

1. Stilbene azo dye, as lithium salt or mixed lithium and sodium salts wherein the ratio of lithium to sodium is at least 1:2, prepared by condensing a member of the group consisting of the lithium salt of 5-nitro-o-toluenesulfonic acid and the dilithium, monolithium monosodium, and disodium salts of 4,4'-dinitro-2,2'-stilbenedisulfonic acid, in an aqueous alkaline reaction medium, at a temperature of from about 20°C. to the boiling temperature of the reaction medium, in the presence of sufficient ionic lithium to provide a ratio of lithium to sodium in the dye of at least 1:2, until formation of said stilbene azo dye is substantially complete.

2. Stilbene azo dye of claim 1, prepared by condensing the lithium salt of 5-nitro-o-toluenesulfonic acid, in an aqueous reaction medium, in the presence of at least about 0.2 mole, per mole of lithium salt, of a base selected from lithium hydroxide and sodium hydroxide, at a temperature of from about 20°C. to the boiling temperature of the reaction medium, in the presence of sufficient ionic lithium to provide a ratio of lithium to sodium in the dye of at least 1:2, until formation of said stilbene azo dye is substantially complete.

3. Stilbene azo dye of claim 1, prepared by condensing, in admixture at a weight ratio of 70:30 to 90:10, the lithium salt of 5-nitro-o-toluenesulfonic acid and a member of the group consisting of the dilithium, monolithium monosodium, and disodium salts of 4,4'-dinitro-2,2'-stilbenedisulfonic acid, in an aqueous reaction medium, in the presence of at least about 0.2 mole, per mole of salts in the mixture, of a base selected from lithium hydroxide and sodium hydroxide, at a temperature of from about 20°C. to the boiling temperature of the reaction medium, in the presence of sufficient ionic lithium to provide a ratio of lithium to sodium in the dye of at least 1:2, until formation of said stilbene azo dye is substantially complete.

4. Stilbene azo dye of claim 1, prepared by condensing a member of the group consisting of the dilithium and monolithium monosodium salts of 4,4'-dinitro-2,2'-stilbenedisulfonic acid, in an aqueous reaction medium, in the presence of at least about 0.2 mole, per mole of stilbene salt, of a base selected from lithium hydroxide and sodium hydroxide, at a temperature of from about 20°C. to the boiling temperature of the reaction medium, in the presence of sufficient ionic lithium to provide a ratio of lithium to sodium in the dye of at least 1:2, until formation of said stilbene azo dye is substantially complete.

5. Stilbene azo dye, as lithium salt or mixed lithium and sodium salts wherein the ratio of lithium to sodium is at least 1:2, prepared by condensing a member of the group consisting of the lithium salt of 5-nitro-o-toluenesulfonic acid and the dilithium, monolithium monosodium, and disodium salts of 4,4'-dinitro-2,2'-stilbenedisulfonic acid, in an aqueous alkaline reaction medium, at a temperature of from about 20°C. to the boiling temperature of the reaction medium, in the presence of sufficient ionic lithium to provide a ratio of lithium to sodium in the dye of at least 1:2, and thereafter reacting the condensation product with a reducing agent.

6. Stilbene azo dye of claim 5, prepared by condensing the lithium salt of 5-nitro-o-toluenesulfonic acid, in an aqueous reaction medium, in the presence of at least 0.2 mole, per mole of lithium salt, of a base selected from lithium hydroxide and sodium hydroxide, at a temperature of from about 20°C. to the boiling temperature of the reaction medium, in the presence of sufficient ionic lithium to provide a ratio of lithium to sodium in the dye of at least 1:2, and thereafter reacting the condensation product with a reducing agent.

7. Stilbene azo dye of claim 5, prepared by condensing, in admixture at a weight ratio of 70:30 to 90:10, the lithium salt of 5-nitro-o-toluenesulfonic acid and a member of the group consisting of the dilithium, monolithium monosodium and disodium salts of 4,4'-dinitro-2,2'-stilbenedisulfonic acid, in an aqueous reaction medium, in the presence of at least about 0.2 mole, per mole of salts in the mixture, of a base selected from lithium hydroxide and sodium hydroxide, at a temperature of from about 20°C. to the boiling temperature of the reaction medium, in the presence of sufficient ionic lithium to provide a ratio of lithium to sodium in the dye of at least 1:2, and thereafter reacting the condensation product with a reducing agent selected.

8. In a process for preparing stilbene azo dye by means of an alkaline condensation of a salt of 5-nitro-o-toluenesulfonic acid or of 4,4'-dinitro-2,2'Stilbenedisulfonic acid, the improvement which comprises condensing a member of the group consisting of the lithium salt of 5-nitro-o-toluenesulfonic acid and the dilithium, monolithium monosodium, and disodium salts of 4,4'-dinitro-2,2'-stilbenedisulfonic acid, in an aqueous alkaline reaction medium, at a temperature of from about 20°C. to the boiling temperature of the reaction medium, in the presence of sufficient ionic lithium to provide a ratio of lithium to sodium in the dye of at least 1:2, until formation of said stilbene azo dye is substantially complete.

9. The process of claim 8 wherein the product of the condensation reaction is reacted with a reducing agent.

10. The process of claim 8 wherein the alkaline medium is produced by means of 0.2 mole, per mole of salt being condensed, of a base selected from lithium hydroxide and sodium hydroxide.

11. The process for the preparation of a solubilized stilbene dye which comprises heating 2-methyl-5-nitrobenzenesulfonic acid in aqueous medium at a temperature of about 40° to about 100°C. and in the presence of at least a stoichiometric amount of lithium hydroxide; said 2-methyl-5-nitrobenzene-sulfonic acid being pure.

12. A process according to claim 11 in which the lithium hydroxide is added incrementally.

* * * * *

UNITED STATES PATENT OFFICE
CERTIFICATE OF CORRECTION

PATENT NO. : 3,905,949
DATED : September 16, 1975
INVENTOR(S) : Melvin A. Perkins & Howard K. Urion It is certified that error appears in the above—identified patent and that said Letters Patent are hereby corrected as shown below:

Column 12, line 11, "selected" should be deleted.

Signed and Sealed this second Day of March 1976

[SEAL]

Attest:

RUTH C. MASON
Attesting Officer

C. MARSHALL DANN
Commissioner of Patents and Trademarks